United States Patent [19]
Cole

[11] Patent Number: 5,685,497
[45] Date of Patent: Nov. 11, 1997

[54] TOWING ASSEMBLY FOR CENTER PIVOT IRRIGATION SYSTEM

[76] Inventor: Warren E. Cole, R.R. 1, Box 111, Merom, Ind. 47861

[21] Appl. No.: 433,023

[22] Filed: May 3, 1995

[51] Int. Cl.$^6$ ............................................... B05B 3/00
[52] U.S. Cl. ................................. 239/742; 239/728
[58] Field of Search ............................ 239/722, 728, 239/742; 137/343, 899

[56] References Cited

U.S. PATENT DOCUMENTS

| | | | |
|---|---|---|---|
| 2,726,895 | 12/1955 | Behlen | 299/49 |
| 3,281,081 | 10/1966 | Purtell | 239/213 |
| 3,379,378 | 4/1968 | Kern | 239/212 |
| 3,662,776 | 5/1972 | Bryant et al. | 137/344 |
| 4,363,444 | 12/1982 | Dejoie | 239/728 |

FOREIGN PATENT DOCUMENTS

| | | | |
|---|---|---|---|
| 256147 | 5/1964 | Australia | 239/742 |

OTHER PUBLICATIONS

Brocure –Knight Distributing Co. (Undated).

Primary Examiner—Robert J. Oberleitner
Assistant Examiner—C. T. Bartz
Attorney, Agent, or Firm—Jacobson, Price, Holman & Stern, PLLC

[57] ABSTRACT

This invention is a towing attachment for each wheeled tower in a center pivot irrigation system in the form of a pair of auxiliary support wheels rotatably supported for rotation about axes generally perpendicular to the pipe and which can be lowered to a position to lift the tower and tower supporting and driving wheels to a position spaced above the ground surface thereby enabling the center pivot irrigation pipe to be detached from the center pivot and towed longitudinally to another site of use with the center pivot pipe then being connected to a different center pivot forming an axial extension of another well casing with the towing attachment auxiliary support wheels then being elevated to lower the tower and tower supporting and driving wheels into engagement with the ground surface for irrigating the new site.

12 Claims, 3 Drawing Sheets

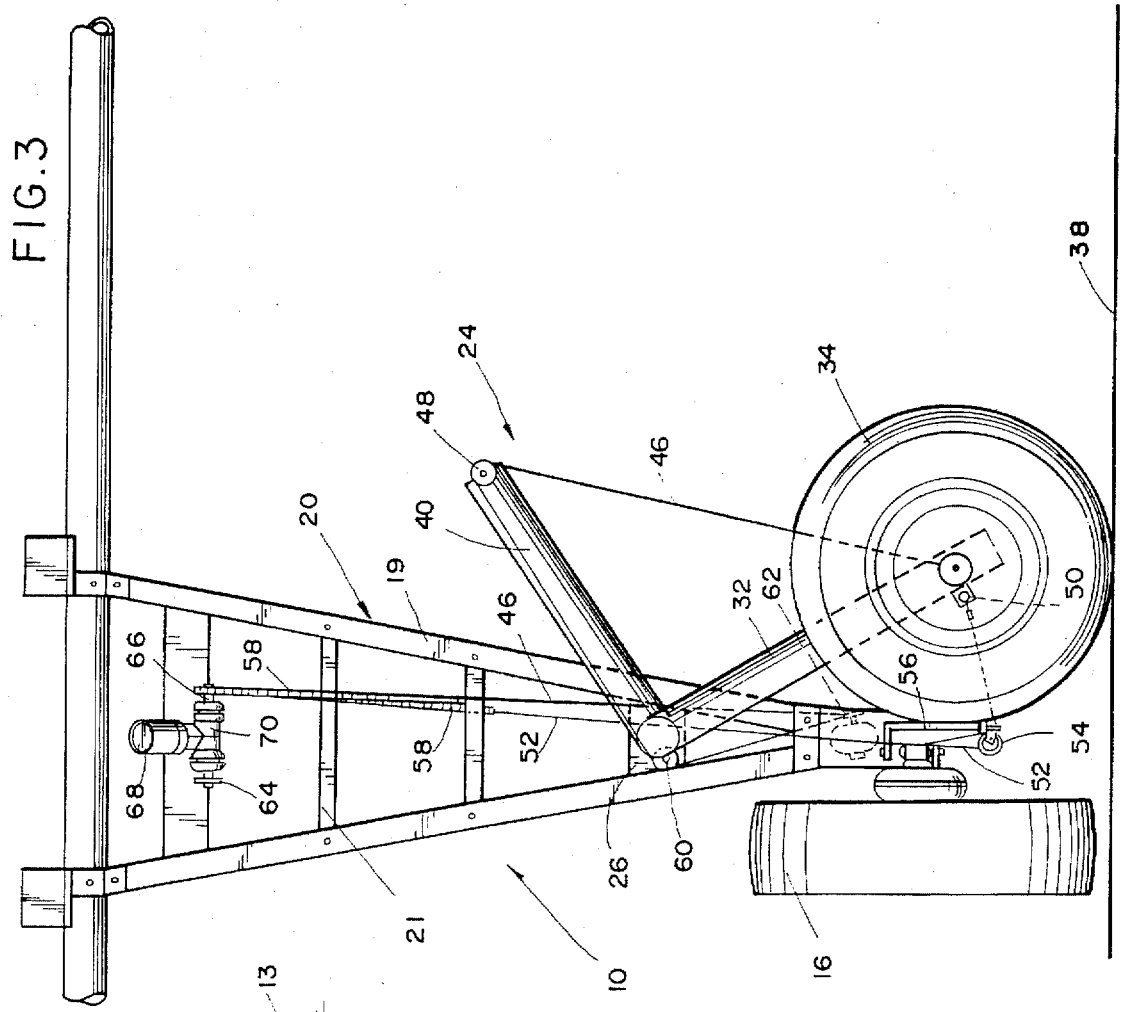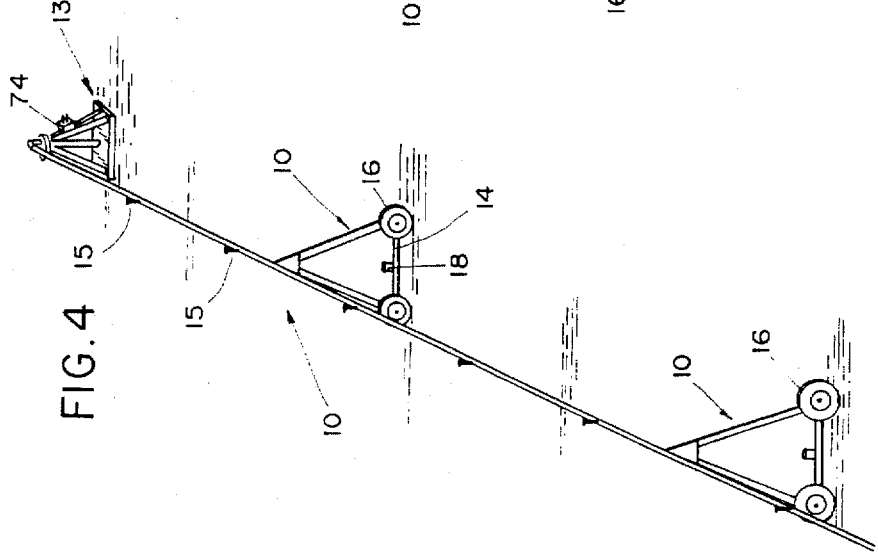

TOWING ASSEMBLY FOR CENTER PIVOT IRRIGATION SYSTEM

BACKGROUND OF THE INVENTION

1. Field of the Invention

The present invention generally relates to improvements in center pivot irrigation systems which conventionally include an elongated pipe having a plurality of discharge nozzles oriented in longitudinally spaced relation along the length of the pipe. One end of the pipe is connected to and supported by a center pivot stand with the pipe being rotatable about a generally vertical axis that forms an axial extension of a well casing. The pipe is supported by a plurality of wheeled towers with each tower including a pair of tandem wheels at the front and rear ends of the towers which support the towers and pipes with the wheels rotating generally about axes parallel to the pipe and being driven in a manner to maintain the sections of the elongated pipe in alignment. This invention is a towing attachment for each wheeled tower in a center pivot irrigation system in the form of a pair of auxiliary support wheels rotatably supported for rotation about axes generally perpendicular to the pipe and which can be lowered to a position to lift the tower and tower supporting and driving wheels to a position spaced above the ground surface thereby enabling the center pivot irrigation pipe to be detached from the center pivot and towed longitudinally to another site of use with the center pivot pipe then being connected to a different center pivot forming an axial extension of another well casing with the towing attachment auxiliary support wheels then being elevated to lower the tower and tower supporting and driving wheels into engagement with the ground surface for irrigating the new site.

2. Description of the Prior Art

Center pivot irrigation systems are used in many locations for irrigating large land areas. A conventional center pivot irrigation system includes an elongated pipe, usually constructed in sections supported in elevated relation to a ground surface to be irrigated by a plurality of wheeled support towers or frames located at longitudinally spaced positions along the elongated pipe. One end of the elongated pipe is pivotally connected to a supporting stand or center pivot with the pipe in communication with a well casing or pump structure with the pipe rotating about a vertical axis generally coaxial with or parallel to the center of the well casing. The pipe includes a plurality of discharge nozzles and usually an end gun to irrigate corner portions of a land area as the irrigation pipe, the towers and supporting and driving wheels all move in a circular path about the center pivot.

In irrigating large land areas, it is desirable to move the center pivot irrigation system from one site of use to another site of use. Inasmuch as the wheels which support the towers are in tandem arrangement and rotate about axes generally parallel to the longitudinal axis of the pipe, the irrigation pipe and towers cannot be towed lengthwise of the pipe due to the rotational axis of the wheels being parallel to the pipe. Various efforts have been made to overcome this problem. One of the most prevalent solutions is the mounting of the supporting and driving wheels on the tower for pivotal movement from a position with the rotational axes parallel to the pipe to a position with the rotational axes perpendicular to the pipe which enables the irrigation pipe, towers and wheels then to be towed to a new site of use after the center pivot end of the pipe has been disconnected from its center pivot support stand and well casing or pump. When the irrigation system reaches a new site of use, the irrigation pipe is connected to a center pivot support stand and associated with another well casing and the supporting and driving wheels are then rotated so that their axes are parallel to the longitudinal axis of the pipe.

Since the towers and pipes are relatively heavy, it is necessary to lift the towers so that the supporting and driving wheels are elevated above the ground surface in order to pivot the wheels 90° when the irrigation system is converted to longitudinal movement and again when the irrigation system is to be converted to movement in a circular path. This procedure requires that a relatively heavy jack or other lifting apparatus be engaged with each tower and usually at each end thereof in order to raise the tower in order to pivot the wheels when converting the irrigation system for longitudinal movement and again when converting the irrigation system for circular movement about a center pivot. In addition to the jack being heavy and cumbersome, it also has a tendency to sink into the ground surface which may be relatively soft due to recent irrigation. A typical structure of this type is disclosed in U.S. Pat. No. 3,662,776 issued May 16, 1972. Another effort to enable longitudinal movement of a sprinkler pipe is disclosed in U.S. Pat. No. 3,281,081 issued Oct. 25, 1996 in which a single large center wheel supports the sprinkler pipe combined with a front and rear wheel in alignment therewith with only one of the front or rear wheels engaging the ground surface. However, both the front and rear wheels can be rotated 90° and lowered in an undescribed manner to support the sprinkler pipe with the large center wheel spaced above the ground surface for movement of the sprinkler system in a direction parallel to the longitudinal extent of the pipe. In view of the weight of the components, some type of lift mechanism, such as a jack, must be used to lift the components to enable the front and rear wheels to be lowered and pivoted 90° so that their axes of rotation is selectively perpendicular to or parallel to the sprinkler pipes. Additional patents relating to this field of endeavor are U.S. Pat. Nos. 2,726,895 issued Dec. 13, 1955 and 3,379,378 issued Apr. 23, 1968.

The above described prior art requires the use of a lifting mechanism such as a jack to raise the supporting and driving wheels off the ground to pivot the supporting wheels or to lift the sprinkler system off the ground to enable auxiliary wheels to be lowered and pivoted. The prior art does not disclose a self contained towing attachment including auxiliary support wheels mounted at the front and rear of each tower which rotate about axes perpendicular to the pipe and which can be lowered by a power mechanism structurally arranged to enable the lowering mechanism to lift the tower and tower supporting and driving wheels by moving the auxiliary support wheels downwardly with sufficient force to simultaneously lift the tower and tower supporting and driving wheels with the auxiliary support wheels having axes perpendicular to the irrigation pipe for towing the irrigation pipe longitudinally to a new site with the power mechanism then elevating the auxiliary wheels and lowering the tower and tower supporting and driving wheels for movement of the irrigation pipe about a center pivot.

SUMMARY OF THE INVENTION

An object of the present invention is to provide a towing assembly for center pivot irrigation systems which includes auxiliary support wheels for each supporting tower in a center pivot irrigation system with the support wheels being mounted for rotation about axes perpendicular to the longitudinal axis of an irrigation pipe on a center pivot irrigation system combined with a structure supporting each auxiliary support wheel to simultaneously lower the auxiliary support wheels with a force to lift the supporting and driving wheels for each irrigation tower to a point above the ground surface to enable the center pivot irrigation system to be towed in a direction longitudinally of the irrigation pipe to a new site of use at which point the auxiliary support wheels can be elevated thus lowering the tower supporting and driving wheels into contact with the ground surface to enable the tower supporting and driving wheels to again drive the towers for movement in a circular path about the center pivot of the center pivot irrigation system.

Another object of the invention is to provide a towing attachment in accordance with the preceding object in which the auxiliary support wheels are supported from the tower frame for arcuate swinging movement about an axis generally perpendicular to the longitudinal axis of the irrigation pipe and perpendicular to the axis of rotation of the tower supporting and driving wheels.

A further object of the invention is to provide a towing assembly in accordance with the preceding objects in which cable and pulley assemblies are associated with the tower frame to provide a positive downward and upward force at an outer end of an elongated support arm that rotatably supports each of the auxiliary supporting wheels to exert a downward or upward thrust on the outer end of the support arms to swing the support arms about axes perpendicular to the irrigation pipe and perpendicular to the axis of rotation of the tower supporting and driving wheels and parallel to the axis of rotation of the auxiliary support wheels.

Still another object of the invention is to provide a towing assembly for a center pivot irrigation system to simultaneously lift all of the supporting and driving wheels for the irrigation system from the center pivot location by electrically lifting each drive wheel by simultaneously lowering an auxiliary support wheel associated with each drive wheel which enables the irrigation system to be disconnected and towed without the necessity of pivoting the supporting and drive wheels from their normal position in which the rotational axes is parallel to the irrigation pipe. When the irrigation system reaches a new site, all of the auxiliary support wheels are simultaneously elevated thus simultaneously lowering all of the supporting and drive wheels for the irrigation system.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an end elevational view of the tower with the auxiliary support wheels in lowered position with the irrigation system supporting and driving wheels elevated above the ground surface to enable longitudinal towing of the center pivot irrigation system to a new site of use.

FIG. 4 is a schematic perspective view illustrating a center pivot irrigation system typical of the prior art.

DESCRIPTION OF THE PREFERRED EMBODIMENT

Figure 1:
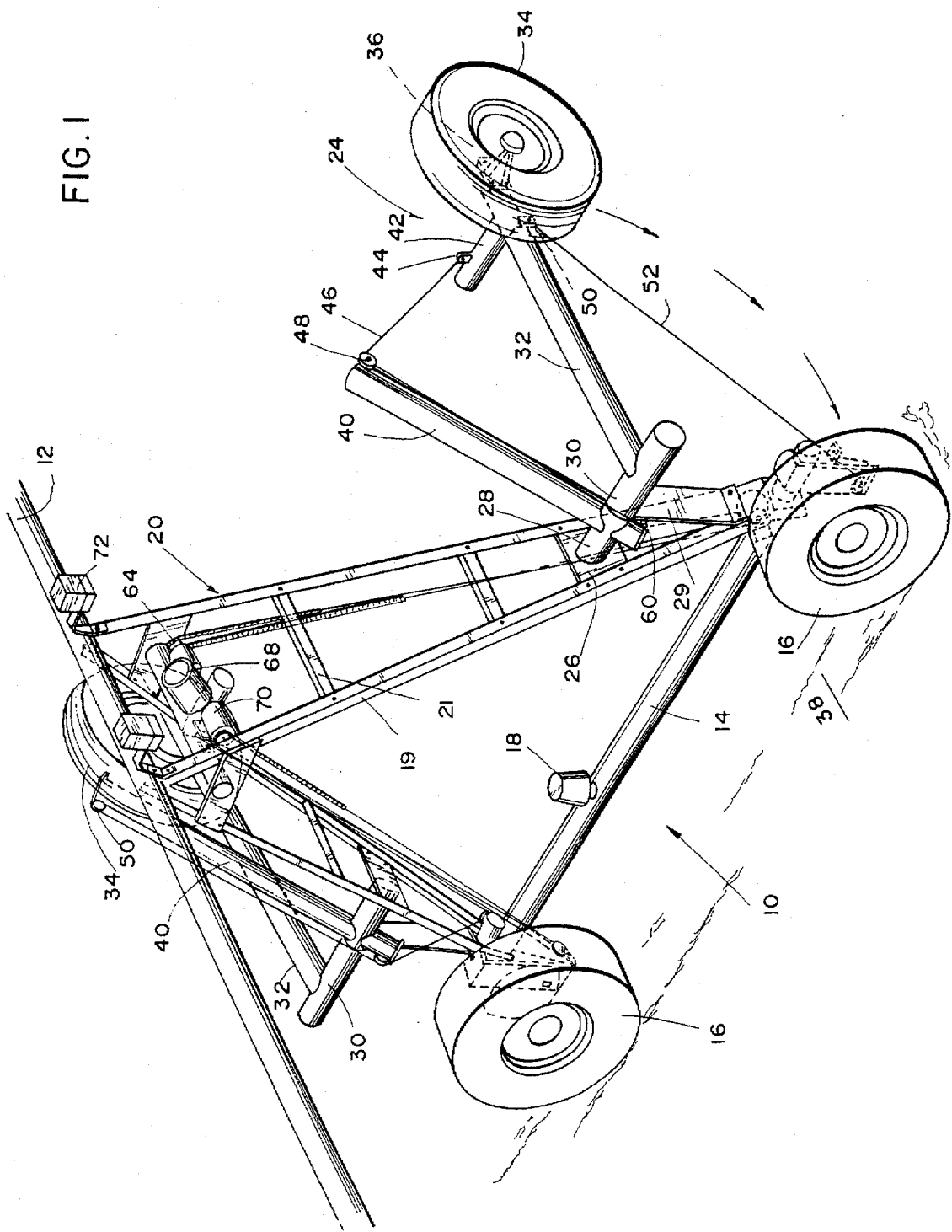
FIG. 1 is a perspective view of the irrigation pipe and one supporting tower with the supporting and driving wheels supporting the tower and the auxiliary supporting wheels in an elevated position.
Figure 2:
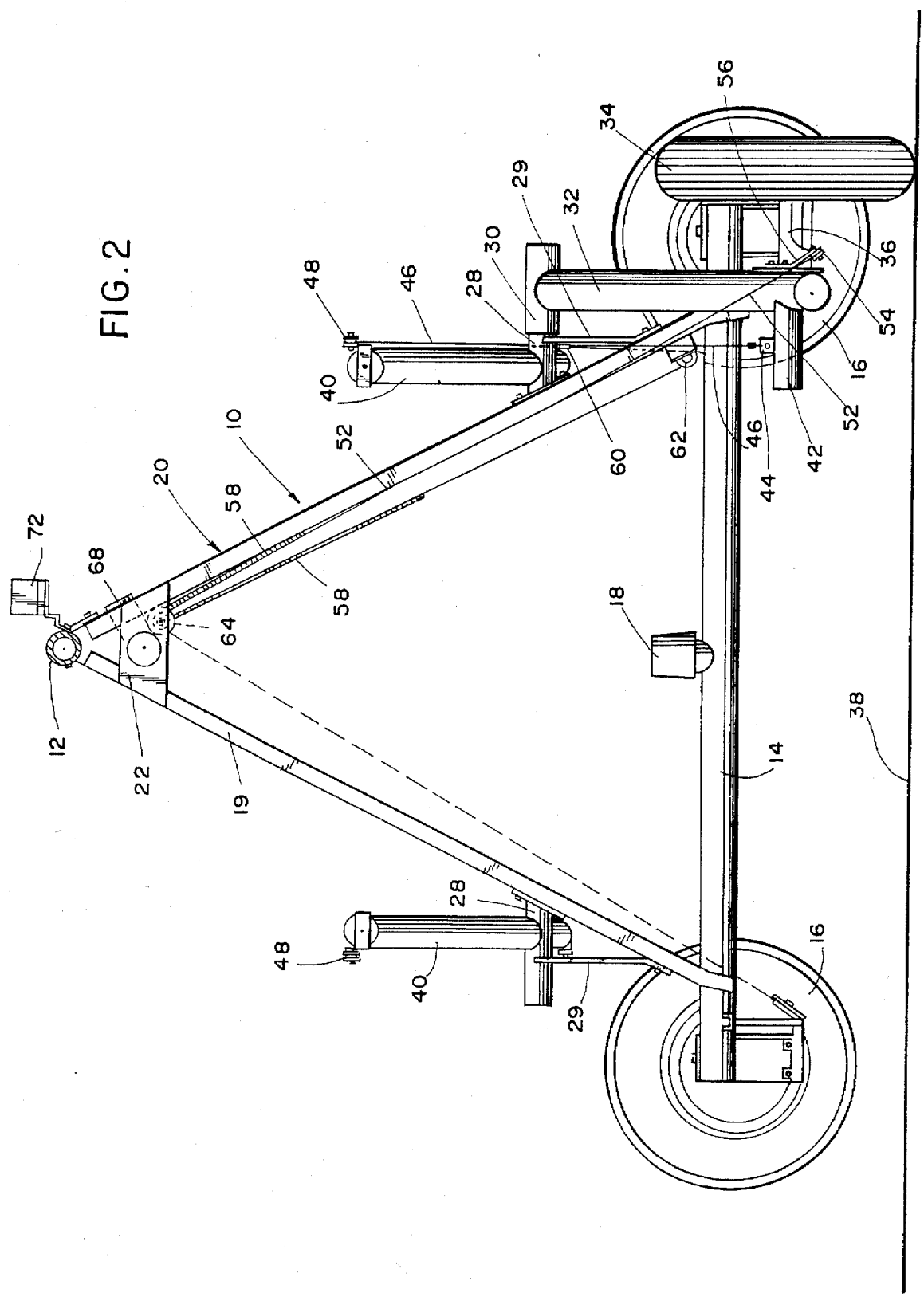
FIG. 2 is a side elevational view of the tower with the auxiliary support wheels in lowered position.

FIGS. 1-3 of the drawings illustrate one supporting and driving tower generally designated by reference numeral 10 for a center pivot irrigation system such as designated by reference numeral 11 in FIG. 4 and which includes an irrigation pipe 12 supported at the apex of the generally inverted V-shaped supporting tower 10 with one end of the irrigation pipe being connected to a center pivot support stand 13 of conventional construction. The irrigation pipe 12 includes a plurality of sprinkler heads or nozzles 15 spaced longitudinally therealong to cover the ground surface as the towers 10 and pipe 12 move in a circular path about the center pivot 13 at one end of the pipe 12. This structure is well known and the tower 10 includes an elongated rigid member 14 having a supporting and driving wheel 16 mounted at each end thereof for rotation about axes parallel to the pipe 12. A central drive motor 18 and drive shaft may be provided for the supporting and driving wheels 16 or individual drive motors may be provided for each of the supporting and driving wheels. Extending upwardly from the ends of the rigid bottom support member 14 is a pair of generally inverted V-shaped frames 20 which converge upwardly and are interconnected by frame members 22 at the upper end and connected to and in supporting engagement with the pipe 12 in a conventional manner. Each frame 20 includes upwardly diverging frame rails 19 interconnected by bracing 21. Existing structures include a mounting for the supporting and drive wheels which enables the supporting and drive wheels to be pivoted 90° when the tower is lifted by a separate jack or a hydraulic mechanism at each end of the bottom frame member 14 with the pivotal movement usually separating the drive shaft to enable the wheels to freely rotate and support the towers when being towed in a direction longitudinally of the pipe.

In the present invention, a self contained lifting and towing mechanism generally designated by reference numeral 24 is incorporated into each of the supporting towers 10 with identical lifting and supporting mechanisms 24 being provided at the front and rear of the tower for lifting simultaneously both of the supporting and driving wheels 16 for the tower 10. Since the structure of the lifting and supporting structure 24 is the same at the front and rear of the tower, the following is a detailed description of the structure at one end of the tower.

The inverted V-shaped frame 20 includes a rigid mounting plate 26 interconnecting the side members or rails 19 of the frame 20 adjacent the lower end thereof but spaced above the supporting structure for the supporting and driving wheel 16. Mounted rigidly on the mounting plate 26 and projecting horizontally outwardly therefrom is a supporting pipe or tube 28 which rotatably supports a cylindrical sleeve or tube 30 thereon in order that the sleeve 30 can rotate about an axis coaxial with the center of the pipe or tube 28 which is horizontally oriented and perpendicular to the longitudinal axis of the pipe 12 and perpendicular to the rotational axes of the supporting and driving wheels 16. A suitable mechanism is provided for retaining the sleeve 30 on the pipe or tube 28 while enabling rotational or pivotal movement thereon.

Extending laterally from the sleeve 30 is an elongated support arm 32 in the form of a pipe or tube. At the outer end of the support arm 32, an auxiliary support wheel 34 is rotatably mounted on a spindle structure 36 extending laterally outwardly from the support arm 32 to rotatably support the undriven auxiliary support wheel 34. The length of the support arm 32 and the diameter of the support wheel 34 is such that when the auxiliary support wheel 34 is pivoted downwardly about the axis of pivotal movement of the sleeve 30, the periphery of the auxiliary support wheel 34 will move downwardly into engagement with the ground surface 38 and to a point below the horizontal plane of the bottom of the supporting and driving wheel 16 thereby lifting the supporting and driving wheel 16 from the ground surface 38 as illustrated in FIGS. 2 and 3. Thus, when both of the auxiliary supporting wheels 34 are simultaneously lowered, both of the supporting and driving wheels 16 are simultaneously elevated above the ground surface 38 which enables the irrigation system to be towed in the longitudinal direction of the irrigation pipe 12 while being supported by the auxiliary support wheels 34.

Also mounted on the support pipe or tube 28 is a laterally extending stationary pipe or tube 40 which is perpendicular to the pipe or tube 28 and in rigid fixed relation thereto and in rigid fixed relation to the tower 10. The pipe or tube 40 is located inwardly of the sleeve 30 and provides a laterally extending and outwardly inclined support rigid with the pipe or tube 28. The pipe or tube 40 is aligned with the inner end portion of a laterally extending pipe or tube 42 secured fixedly to the pivotal support arm 32 adjacent the outer end thereof. The support tube 42 includes a bracket 44 aligned with the end pipe 40 and having a cable 46 attached thereto. The cable 46 extends over a pulley 48 mounted on the outer end of support pipe or tube 40 with the cable 46 then extending inwardly along the length of the pipe or tube 40. Attached to an outer end portion of the pivotal support arm 32 is a bracket 50 having a cable 52 attached thereto with the bracket being at the underside of the pivotal support arm 32. The cable 52 extends toward the lower end of the tower 10 and is entrained under a pulley 54 supported on a depending bracket 56 attached to the lower end of the inverted V-shaped frame 20. The cable 52 extends upwardly from the pulley 54 and is connected to one end of an elongated sprocket chain The cable 46 passes over the pulley 48, inwardly along the support pipe 40, over a pulley 60 mounted on the mounting plate 26 and then downwardly under a pulley 62 mounted below the mounting plate 60 and then upwardly for connection with the other end of the sprocket chain 58. The sprocket chain 58 extends over and is driven by a sprocket gear 64 engaged with an output shaft 66 from a reversible electric motor 68 and gear box 70. As illustrated, the gear box 70 drives two sprocket gears 64 with one sprocket gear operating the auxiliary support wheel 34 at the rear of the tower and the other sprocket gear operating the auxiliary support wheel 34 at the front end of the tower for simultaneously moving the support wheels 34 upwardly and downwardly in an arcuate manner as illustrated by the directional arrows in FIG. 1 by reversing the output direction of the reversible motor 68. The electric motor 68 is controlled through a control box 72 to enable the motor 68 at each of the towers to be simultaneously operated electrically from a control panel 74 at the pivot stand 13 of the center pivot irrigation system 11.

The length of the pivotal support arms 32 and the upward angled position of the support pipes or tubes 40 enables the auxiliary support wheels or tow wheels 34 to be lifted to a height of approximately seven feet to eliminate any possible crop damage when the irrigation system is in the irrigation mode. The components of the tow assembly can be retrofitted to an existing center pivot irrigation system with the components being transported in a disassembled condition and easily assembled at the site of use. The tow assembly eliminates the use of a hand operated jack and provides a significant reduction in time needed to convert the irrigation system to a towing mode, towing the system to a new use site and converting the system back to an irrigation mode. The time saving is primarily obtained from simultaneous operation of the towing wheels on all of the towers which eliminates the conventional procedure that involves manually jacking up the drive wheels for each tower, disconnecting the drive shaft, pulling the drive pin, disengaging the pivotal mount of each of the supporting and drive wheels by removing a locking bolt or pin, rotating each of the supporting and driving wheels 90° and locking the rotated supporting and driving wheels in their towed position, repeating this procedure at each tower, then towing the irrigation system to a new site and reversing the procedure by using a hand operated jack and releasing the supporting and driving wheels and rotating them back to their irrigation mode position, reconnecting the drive system and locking the supporting and drive wheels in place. The towing assembly of the present invention is not only capable of use with a system that has supporting and towing wheels which can be pivoted to a towing position but also will convert a nontowing irrigation system to a towable center pivot irrigation system. Rather than taking several minutes to convert each tower from an irrigation mode to a towing mode and from a towing mode to an irrigation mode, the towing assembly of this invention enables the entire irrigation system to be converted between an irrigation mode and a towing mode in only several minutes since the auxiliary support wheels or towing wheels 34 are all simultaneously raised or lowered from a control panel at the center pivot of the irrigation system.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A towing assembly for a center pivot irrigation system including an elongated pipe supported in elevated position by supporting towers with each supporting tower including a front and rear supporting and driving wheel mounted for rotation about an axis generally parallel to the pipe for movement of the pipe and towers in a circular path, said towing assembly comprising a front and rear auxiliary supporting wheel on each tower, means supporting each of said auxiliary supporting wheels from a tower for arcuate swinging movement in a vertical plane about a generally horizontal axis generally perpendicular to said pipe and rotational axes of the supporting and driving wheels and means moving said auxiliary support wheels arcuately about said axes generally perpendicular to the pipe from an elevated position in spaced relation to the ground surface to a lowered position to engage the ground surface and lift the supporting and driving wheels off the ground surface to support the irrigation system while being towed in a direction longitudinally of the pipe to a new site of use with the supporting and driving wheels off the ground surface, said means moving said auxiliary support wheels also raising said auxiliary support wheels in an arcuate swinging movement about said axes generally perpendicular to the pipe to lower the towers to engage the supporting and driving wheels with the ground surface and elevate the auxiliary support wheels from the ground surface to enable the irrigation system to pivot about a center pivot at the new site.

2. The towing assembly as defined in claim 1 wherein said means supporting each of the towing wheels from the tower includes a supporting arm having one end pivotally supported from the tower for pivotal movement about an axis perpendicular to the pipe and to the rotational axis of the supporting and driving wheels, said supporting arm including means journaling an auxiliary supporting wheel from an outer end portion of said arm for rotation about an axis perpendicular to the pipe and perpendicular to the rotational axes of the supporting and driving wheels, said means moving the auxiliary support wheels being connected to said support arms in spaced relation to the pivotally supported end thereof for pivoting the support arms in a vertical plane and moving the auxiliary support wheels in a vertical plane.

3. The towing assembly as defined in claim 2 wherein said means moving the auxiliary support wheels includes cables attached to said support arm adjacent an outer end thereof, said cables being entrained over supported pulleys above and below the support arm and connected with a power device to power the support arm arcuately in a vertical plane to lift the tower and the supporting and driving wheels when the auxiliary support wheels are lowered into engagement with the ground surface and forced downwardly to simultaneously lift the supporting and driving wheels, said power device also moving the auxiliary support wheels to an elevated position above the ground surface for simultaneously lowering the supporting and driving wheels into engagement with the ground surface.

4. The towing assembly as defined in claim 3 wherein the pulleys above the support arm are rigidly supported from the tower to enable the auxiliary support wheels to be lifted to a position above mature crops to eliminate plant damage during movement of the center pivot irrigation system about a center pivot.

5. A towing assembly for a center pivot irrigation system including an elongated pipe supported in elevated position by supporting towers with each supporting tower including a front and rear supporting and driving wheel mounted for rotation about an axis generally parallel to the pipe for movement of the pipe and towers in a circular path, said towing assembly comprising a front and rear auxiliary supporting wheel on said tower, means supporting each of said auxiliary supporting wheels from the tower for arcuate swinging movement in a vertical plane and for rotation about axes perpendicular to the pipe and rotational axes of the supporting and driving wheels and means moving said auxiliary support wheels from an elevated position in spaced relation to the ground surface to a lowered position to engage the ground surface and lift the supporting and driving wheels off the ground surface to support the irrigation system while being towed longitudinally of the pipe to a new site of use with the supporting and driving wheels off the ground surface, said means moving said auxiliary support wheels also raising said auxiliary support wheels to lower the towers to engage the supporting and driving wheels with the ground surface to enable the irrigation system to pivot about a center pivot at the new site, said means supporting each of the towing wheels from the tower including a supporting arm having one end pivotally supported from the tower for pivotal movement about an axis perpendicular to the pipe and to the rotational axis of the supporting and driving wheels, said supporting arm including means journaling an auxiliary supporting wheel from an outer end portion of said arm for rotation about an axis perpendicular to the pipe and perpendicular to the rotational axes of the supporting and driving wheels, said means moving the auxiliary support wheels being connected to said support arms in spaced relation to the pivotally supported end thereof for pivoting the support arms in a vertical plane and moving the auxiliary support wheels in a vertical plane, said means moving the auxiliary support wheels including cables attached to said support arm adjacent an outer end thereof, said cables being entrained over supported pulleys above and below the support arm and connected with a power device to power the support arm arcuately in a vertical plane to lift the tower and the supporting and driving wheels when the auxiliary support wheels are lowered into engagement with the ground surface and forced downwardly to simultaneously lift the supporting and driving wheels, said power device also moving the auxiliary support wheels to an elevated position above the ground surface for simultaneously lowering the supporting and driving wheels into engagement with the ground surface, the pulleys above the support arm being rigidly supported from the tower to enable the auxiliary support wheels to be lifted to a position above mature crops to eliminate plant damage during movement of the center pivot irrigation system about a center pivot, said means moving the auxiliary support wheels including a reversible electric motor supported from an upper end of a tower and including a pair of sprocket output gears, a sprocket chain engaged with each sprocket gear, said sprocket chain including end portions attached to said cables for positively moving the auxiliary support wheels upwardly and downwardly.

6. The towing assembly as defined in claim 5 wherein said reversible electric motor is controlled from an electrical control panel at the center pivot for simultaneously raising or lowering all of the auxiliary support wheels and the supporting and driving wheels on all of the towers thereby eliminating the necessity of individually lifting each of the towers by the use of a jack or other equipment thereby reducing the time to convert the irrigation system from an irrigation mode to a towing mode and back to an irrigation mode.

7. In an irrigation system including an elongated irrigation pipe having one end communicated with a source of pressured water, a plurality of spray nozzles on said pipe oriented in longitudinally spaced relation, a plurality of longitudinally spaced supports connected to said pipe, ground engaging driven support means on each of said supports to move said pipe along a ground surface, auxiliary ground engageable support means mounted on each of said longitudinally spaced supports, means moving said auxiliary ground engageable support means arcuately downwardly and upwardly about a horizontal axis generally perpendicular to said pipe, said downward movement lifting said ground engaging driven support means upwardly out of contact with the ground surface, said upward movement lowering the ground engaging driven support means into supporting engagement with the ground surface and lifting said auxiliary ground engageable support means upwardly out of contact with the ground surface, said auxiliary ground engageable support means supporting said pipe, supports and ground engaging driven support means in elevated position for movement in a direction longitudinally of said pipe for movement to a new site when the auxiliary ground engageable support means is moved downwardly.

8. The combination as defined in claim 7 wherein said rotatable wheels supported for rotation about axes perpendicular to a longitudinal axis of said pipe.

9. The combination as defined in claim 8 wherein said ground engaging driven support means on each support is a pair of tandem driven support wheels on each support rotatable about axes parallel to said pipe for movement of the pipe along a ground surface.

10. In combination with a center pivot irrigation system including a center pivot support stand, an elongated irrigation pipe having one end rotatably supported by said stand and communicated with a source of pressured water, a plurality of spray nozzles on said pipe oriented in longitudinally spaced relation, a plurality of longitudinally spaced supports connected to said pipe, ground engaging driven support means on each of said supports to move said pipe in a circular path about the center pivot support stand, auxiliary ground engageable support means mounted on each of said longitudinally spaced supports, means moving said auxiliary ground engageable support means downwardly and upwardly, said downward movement elevating said ground engaging driven support means above the ground surface, said upward movement lowering the ground engaging driven support means into supporting engagement with the ground surface, said auxiliary support means supporting said pipe and supports for movement in a direction longitudinally of said pipe for movement to a new site, said auxiliary ground engageable support means is a pair of freely rotatable wheels supported for rotation about axes perpendicular to a longitudinal axis of said pipe, said ground engaging driven support means on each support is a pair of tandem driven support wheels on each support rotatable about axes parallel to said pipe for movement of the pipe in a circular path, said auxiliary support wheels on all of said supports being moved downwardly and upwardly simultaneously from a control at the center pivot support stand for converting the irrigation system between an irrigation mode and a longitudinal towing mode in a short time period.

11. The combination as defined in claim 10 wherein said tandem driven wheels on each support being supported for pivotal movement and disabling of drive power when each of the tandem wheels are elevated.

12. The irrigation system as defined in claim 7 wherein said auxiliary ground engageable support means includes a pair of freely rotatable wheels, each of said wheels being mounted on an elongated support arm, one end portion of each support arm being pivotally supported from a support for the pipe for pivotal movement about an axis perpendicular to the pipe for movement in a vertical plane, said means moving the arms being connected to the arms in spaced relation to the pivotal connection with the supports for moving the auxiliary support wheels arcuately in a vertical plane between elevated positions enabling the driven support means to support the pipe for movement in a direction perpendicular to the pipe and a position with the auxiliary support wheels lifting the pipe, supports and ground engaging driven support means from the ground surface for movement of the pipe in a longitudinal direction.

\* \* \* \* \*